(12) United States Patent
Chen

(10) Patent No.: US 10,862,686 B2
(45) Date of Patent: Dec. 8, 2020

(54) APPLICATION DECRYPTION METHOD, TERMINAL AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventor: Zhenzhen Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 139 days.

(21) Appl. No.: 15/999,290

(22) Filed: Aug. 16, 2018

(65) Prior Publication Data
US 2019/0074971 A1   Mar. 7, 2019

(30) Foreign Application Priority Data
Sep. 7, 2017 (CN) .......................... 2017 1 0801524

(51) Int. Cl.
*H04L 9/32* (2006.01)
*G06F 21/32* (2013.01)
(Continued)

(52) U.S. Cl.
CPC .......... *H04L 9/3231* (2013.01); *G06F 3/0488* (2013.01); *G06F 3/04817* (2013.01);
(Continued)

(58) Field of Classification Search
CPC ................ H04L 9/3231; G06F 3/04817; G06F 3/04842; G06F 3/0488; G06F 21/32
(Continued)

(56) References Cited

U.S. PATENT DOCUMENTS

| | | | |
|---|---|---|---|
| 2006/0155652 A1 | 7/2006 | Colby | |
| 2013/0179173 A1* | 7/2013 | Lee | .......................... G10L 15/22 704/275 |

(Continued)

FOREIGN PATENT DOCUMENTS

| | | |
|---|---|---|
| CN | 104866750 A | 8/2015 |
| CN | 105426712 A | 3/2016 |

(Continued)

OTHER PUBLICATIONS

Extended European Search Report for EP patent application No. 18188915.5, dated Jan. 24, 2019. (8 Pages).
(Continued)

*Primary Examiner* — Dant B Shaifer Harriman
(74) *Attorney, Agent, or Firm* — Ladas & Parry LLP

(57) ABSTRACT

Provided are an application decryption method, a terminal and a non-transitory computer-readable storage medium and relates to a technical field of terminals. In the method, a touch operation is acquired through a display screen of a terminal; fingerprint information of the touch operation is acquired through a fingerprint sensor located at a position corresponding to the touch operation, the fingerprint sensor being arranged below the display screen of the terminal; a target application that is encrypted is decrypted in a case where the fingerprint information of the touch operation is matched with encryption fingerprint information of the target application.

17 Claims, 11 Drawing Sheets

Acquire a touch operation through a display screen of a terminal — 101

Acquire fingerprint information of the touch operation through a fingerprint sensor located at a position corresponding to the touch operation, the fingerprint sensor being arranged below the display screen of the terminal — 102

Decrypt, in a case where the fingerprint information of the touch operation is matched with encryption fingerprint information of the target application, a target application that is encrypted — 103

(51) Int. Cl.
- *G06F 21/62* (2013.01)
- *G06F 3/0481* (2013.01)
- *G06F 3/0484* (2013.01)
- *G06F 3/0488* (2013.01)

(52) U.S. Cl.
CPC .......... *G06F 3/04842* (2013.01); *G06F 21/32* (2013.01); *G06F 21/6281* (2013.01)

(58) Field of Classification Search
USPC .......................................................... 713/186
See application file for complete search history.

(56) References Cited

U.S. PATENT DOCUMENTS

| | | | | |
|---|---|---|---|---|
| 2016/0147411 A1* | 5/2016 | Li | ........................ | G06F 3/0481 715/846 |
| 2019/0087629 A1* | 3/2019 | Wang | ...................... | G06K 9/22 |

FOREIGN PATENT DOCUMENTS

| | | |
|---|---|---|
| CN | 105574393 A | 5/2016 |
| CN | 105825103 A | 8/2016 |
| CN | 106095224 A | 11/2016 |
| CN | 106127013 A | 11/2016 |
| CN | 106203176 A | 12/2016 |
| CN | 106815508 A | 6/2017 |
| CN | 107491683 A | 12/2017 |
| JP | 5606705 B2 | 9/2014 |

OTHER PUBLICATIONS

International Search Report for PCT application No. PCT/CN2018/101288 filed on Aug. 20, 2018, dated Nov. 8, 2018.
First Office Action for Chinese application No. 201710801524.4 filed on Sep. 7, 2017, dated Jul. 3, 2018.
The First Examination Report for IN patent application No. 201814033096, dated Jul. 10, 2020.

* cited by examiner

APPLICATION DECRYPTION METHOD, TERMINAL AND NON-TRANSITORY COMPUTER-READABLE STORAGE MEDIUM

CROSS REFERENCE TO RELATED APPLICATIONS

This application claims priority to Chinese Patent Application No. 201710801524.4, filed with the Chinese Patent Office on Sep. 7, 2017 and entitled "Application Decryption Method and Device, Terminal and Computer-Readable Storage Medium", which is incorporated herein by reference in its entirety.

TECHNICAL FIELD

The disclosure relates to a technical field of terminals, and particularly to an application decryption method, a terminal and a non-transitory computer-readable storage medium.

BACKGROUND

Nowadays, terminals have become an inevitable part in people's life. When using a terminal, a user may install a large number of applications in the terminal. Personal privacy information of the user may be stored in some applications, for example, basic account information, identity information, bank card information or other sensitive information of the user. In order to ensure security of the personal privacy information, the terminal may encrypt the applications storing the personal privacy information of the user, and the user may decrypt the applications before using them.

In a related technology, when detecting a selecting operation of a user over a target application, a terminal displays a verification interface to prompt the user to input verification information, then the user inputs the verification information in the currently displayed verification interface, and the terminal compares the verification information input by the user with stored verification information and, if the verification information input by the user is consistent with the stored verification information, decrypts and enters the application.

SUMMARY

Embodiments of the disclosure provide an application decryption method, a terminal and a non-transitory computer-readable storage medium, which may solve a problem of relatively tedious flow during application decryption in a related technology. The technical solutions are described as follows.

In at least one alternative embodiment, an application decryption method is provided, which includes that: a touch operation is acquired through a display screen of a terminal; fingerprint information of the touch operation is acquired through a fingerprint sensor located at a position corresponding to the touch operation, the fingerprint sensor being arranged below the display screen of the terminal; and a target application that is encrypted is decrypted in a case where the fingerprint information of the touch operation is matched with encryption fingerprint information of the target application.

In at least one alternative embodiment, a terminal is provided, which includes a display screen, at least one fingerprint sensor arranged below the display screen, at least one processor and a computer readable storage, coupled to the at least one processor and storing at least one computer executable instruction thereon, which when the at least one computer executable instruction is executed by the at least one processor, causes the at least one processor to carry out following actions: a touch operation on an icon of a target application that is encrypted is received through the display screen; a fingerprint sensor located at the icon of the target application is activated, and fingerprint information of the touch operation is acquired through the activated fingerprint sensor; and the target application is started in a case where the fingerprint information of the touch operation is matched with encryption fingerprint information of the target application.

In at least one alternative embodiment, a non-transitory computer-readable storage medium, on which a computer program is stored, is provided. The computer program, when being executed by a processor, causes the processor to carry out the following actions: a touch operation is acquired through a display screen of a terminal; fingerprint information of the touch operation is acquired through a fingerprint sensor located at a position corresponding to the touch operation, the fingerprint sensor being arranged below the display screen of the terminal; and the target application is decrypted in a case where the fingerprint information of the touch operation is matched with encryption fingerprint information of a target application that is encrypted.

BRIEF DESCRIPTION OF THE DRAWINGS

In order to describe the technical solutions in the embodiments of the disclosure more clearly, the drawings required to be used in descriptions about the embodiments will be simply introduced below. The drawings in the following descriptions are only some embodiments of the disclosure. Those of ordinary skilled in the art may obtain other drawings according to these drawings without creative work.

DETAILED DESCRIPTION OF THE EMBODIMENTS

Figure 1:
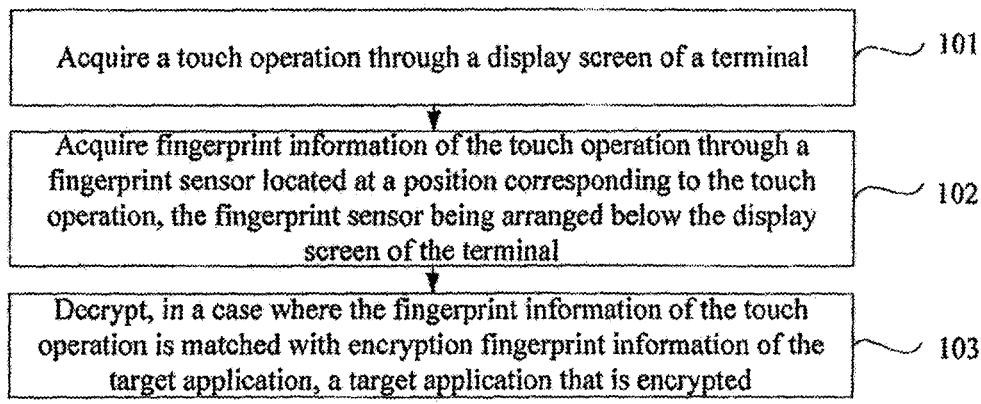
FIG. 1 is a flowchart of an application decryption method according to an embodiment of the disclosure.

In order to make the purpose, technical solutions and advantages of the disclosure clearer, implementation modes of the disclosure will further be described below in combination with the drawings in detail.

Before the embodiments of the disclosure are explained and described in detail, an application scenario involved in the embodiments of the disclosure will be introduced at first.

Nowadays, terminals have become an inevitable part in people's life. When using a terminal, a user may install a large number of applications in the terminal. Some applications may involve personal privacy information of the user. For example, friend information of the user and personal identity information of the user may be stored in social applications. Bank account information of the user may be stored in some financial planning applications or bank applications. For another example, identity information and payment account information of the user may be stored in shopping applications and some payment applications, and even bank card accounts of the user may even be bound to these applications. In the scenario, once the terminal is lost or used by another malicious user, there may exist great potential safety hazards to the personal privacy information of the user in these applications. Therefore, for ensuring security of the personal privacy information of the user, the terminal may encrypt these applications.

In addition, a user may also install, for example, video and game applications in a terminal, but an underaged child in the family of the user may use these applications to watch a video or play a game without notifying the user. In the scenario, for preventing the underaged child from getting addicted to the video or the game, the user may also encrypt these applications.

After an application is encrypted in the abovementioned scenario, the user needs to decrypt the application before he/she can use the application. The embodiments of the disclosure provide a method for decrypting an encrypted application to make an application decryption operation flow more flexible, simpler and smoother.

In a related technology, when detecting a selecting operation of a user over a target application, a terminal may display a verification interface to prompt the user to input verification information. The verification information may usually be a password and may also be fingerprint information. When the verification information is the password, a password input box may be displayed on the verification interface, and the user may input the password for the terminal to verify an identity of the user according to the input password. When the verification information is the fingerprint information, a physical button configured for fingerprint recognition is arranged on the terminal, prompting information may be displayed in the verification interface to prompt the user to execute a touch operation on the physical button for the terminal to acquire the fingerprint information to verify the identity of the user.

On one aspect, no matter which verification information is adopted for verification, the terminal displays the verification interface, which makes a processing process of the terminal complex, and makes the user sensually feel like being exactly stopped after selecting the application, since the user cannot smoothly and continuously enter the application but is required to stop and additionally input the verification information to enter the application. On another aspect, when the user inputs the fingerprint information on the verification interface, the user is required to execute the touch operation at a specified position on the body of the terminal in order that the terminal may acquire the fingerprint information of the user, which brings inflexibility to operations. On such a basis, the embodiments of the disclosure provide an application decryption method, which may solve the problems of tedious, unsmooth and inflexible operation and the like during application decryption in the related technology. The application decryption method provided by the embodiments of the disclosure will now be explained and described in combination with the drawings in detail.

FIG. 1 is a flowchart of an application decryption method according to an exemplary embodiment. Referring to FIG. 1, the method may be applied to a terminal such as a smart phone or a tablet computer. At least one fingerprint sensor is arranged below a display screen of the terminal. The method includes blocks 101 to 103.

In block 101, a touch operation is acquired through a display screen of a terminal.

In block 102, fingerprint information of the touch operation is acquired through a fingerprint sensor located at a position corresponding to the touch operation, the fingerprint sensor being arranged below the display screen of the terminal.

At least one fingerprint sensor may be arranged below the display screen of the terminal. As an exemplary implementation, a plurality of fingerprint sensors may be arranged below the display screen of the terminal. After a region touched by the touch operation is determined, the terminal may activate, among the plurality of fingerprint sensors, a fingerprint sensor located in the region and may not activate the other fingerprint sensors to reduce power consumption of the terminal.

In block 103, a target application that is encrypted is decrypted in a case where the fingerprint information of the touch operation is matched with encryption fingerprint information of the target application. In a case where there are a plurality of target applications, the operation that the target application is decrypted may include that: the plurality of target applications are simultaneously decrypted.

In the embodiment, a touch operation is acquired through a display screen of a terminal; fingerprint information of the touch operation is acquired through a fingerprint sensor located at a position corresponding to the touch operation, the fingerprint sensor being arranged below the display screen of the terminal (there may be at least one fingerprint sensor arranged below the display screen of the terminal); and the target application is decrypted in a case where the fingerprint information of the touch operation is matched with encryption fingerprint information of a target application that is encrypted. In such a manner, the terminal may directly acquire the fingerprint information while the user touches the display screen no matter on which position the touch is performed, so that the terminal can verify whether the user is allowed to access to at least one target application. The terminal does not need to display a verification interface to prompt the user to input verification information at a specific position, so that an operation flow is simplified, and the user may execute an application decryption operation more flexibly, simply and smoothly.

In an exemplary embodiment of the disclosure, the target application may be started after decrypting the target application, in a case where the touch operation is used for requesting to start the target application.

There may be multiple scenarios in which the touch operation is used for requesting to start the target application. For example, the target application may be started in a case where the touch operation acts on an icon of the target application.

As an exemplary implementation, at least one fingerprint sensor is arranged below the display screen of the terminal. The terminal may receive the touch operation on the icon of the target application through the display screen, then activate the fingerprint sensor located at the icon of the target application and acquire the fingerprint information of the touch operation through the activated fingerprint sensor, and the terminal directly starts the target application in a case where the acquired fingerprint information of the touch operation is matched with the encryption fingerprint information of the target application. In such a manner, when the user opens an application, no matter where the application is currently located on the display screen, the terminal may directly acquire the fingerprint information while the user opens the application so as to verify an identity of the user. The terminal does not display a verification interface to prompt the user to input verification information at a specific position, so that an operation flow is simplified, and the user may execute an application decryption operation more flexibly, simply and smoothly.

In another exemplary embodiment of the disclosure, a state of the target application may be set as a decrypted state in a case where the touch operation is not used for requesting to start the target application. That is, when the touch operation is performed at any position except those for selecting an application, the fingerprint information of such touch operation can still be acquired and used for decrypting an application or applications. In such a scenario, the state of the application or applications for which the encryption fingerprint information is consistent with the acquired fingerprint information can be set as decrypted state. Under such a decrypted state, the application or applications can be started directly without the necessity of inputting verification information. For safety reasons, the state of the target application may be set as an encrypted state when a preset duration has elapsed after the state of the target application is set as the decrypted state, that is, the target application may be set to an encrypted state again after a preset duration has elapsed from the moment at which the target application is set to a decrypted state, so as to prevent a potential risk of offering other users the chance of starting the target application.

In the exemplary embodiments, the operation that the fingerprint information of the touch operation is acquired through the fingerprint sensor located at the position corresponding to the touch operation may include that:

receiving time of the touch operation is acquired; and the fingerprint information of the touch operation is acquired through the fingerprint sensor located at the position corresponding to the touch operation in a case where the receiving time is within a preset time range.

In the exemplary embodiments, encryption fingerprint information may be set for at least one application in the terminal in responsive to an application encryption setting instruction. The operation that the encryption fingerprint information is set for the at least one application in the terminal may include that, a target touch operation for selecting the at least one application is acquired through the display screen, and fingerprint information of the target touch operation is acquired through a fingerprint sensor located at a position corresponding to the target touch operation; the encryption fingerprint information for the at least one application is determined based on the fingerprint information of the target touch operation, wherein in a case where the at least one application includes a plurality of applications, the plurality of applications have mutually different encryption fingerprint information, or at least two applications in the plurality of applications have the same encryption fingerprint information; and an application identifier of the at least one application and the encryption fingerprint information of the at least one application are correspondingly stored. As an exemplary implementation, before the operation that the fingerprint information of the touch operation is acquired through the activated fingerprint sensor, the method may further include that: in a case where an application encryption setting instruction is received, at least one touch operation is received at an icon of at least one application through the display screen; the fingerprint sensor located at the icon of the at least one application is activated, and fingerprint information of the at least one touch operation is acquired through the activated fingerprint sensor; encryption fingerprint information of the at least one application is determined based on the acquired fingerprint information; and an application identifier of the at least one application is acquired, and the application identifier of the at least one application and the encryption fingerprint information of the at least one application are correspondingly stored.

In the exemplary embodiments, the implementation of using the fingerprint sensor to acquire the fingerprint information may be achieved in various applicable manners. For example, the fingerprint sensor located at the position corresponding to the touch operation is activated and the fingerprint information of the touch operation is acquired through the activated fingerprint sensor. Alternatively, for example, a plurality of fingerprint sensors arranged below the display screen are activated and the fingerprint information of the touch operation is acquired through the fingerprint sensor, located at the position corresponding to the touch operation, in the plurality of fingerprint sensors.

In the exemplary embodiments, the method may further include that:

in a case where the fingerprint information of the touch operation is not matched with the encryption fingerprint information of the target application, a number of times for which the fingerprint information not matched with the encryption fingerprint information of the target application is acquired within a preset duration is obtained; and in a case where the number of times for which the fingerprint information not matched with the encryption fingerprint information of the target application is acquired is larger than a preset number of times, prompting information for prompting that the target application is encrypted is displayed.

All of the optional technical solutions may be freely combined to form optional embodiments of the disclosure, which will not be elaborated one by one in the embodiments of the disclosure.

Figure 2A:
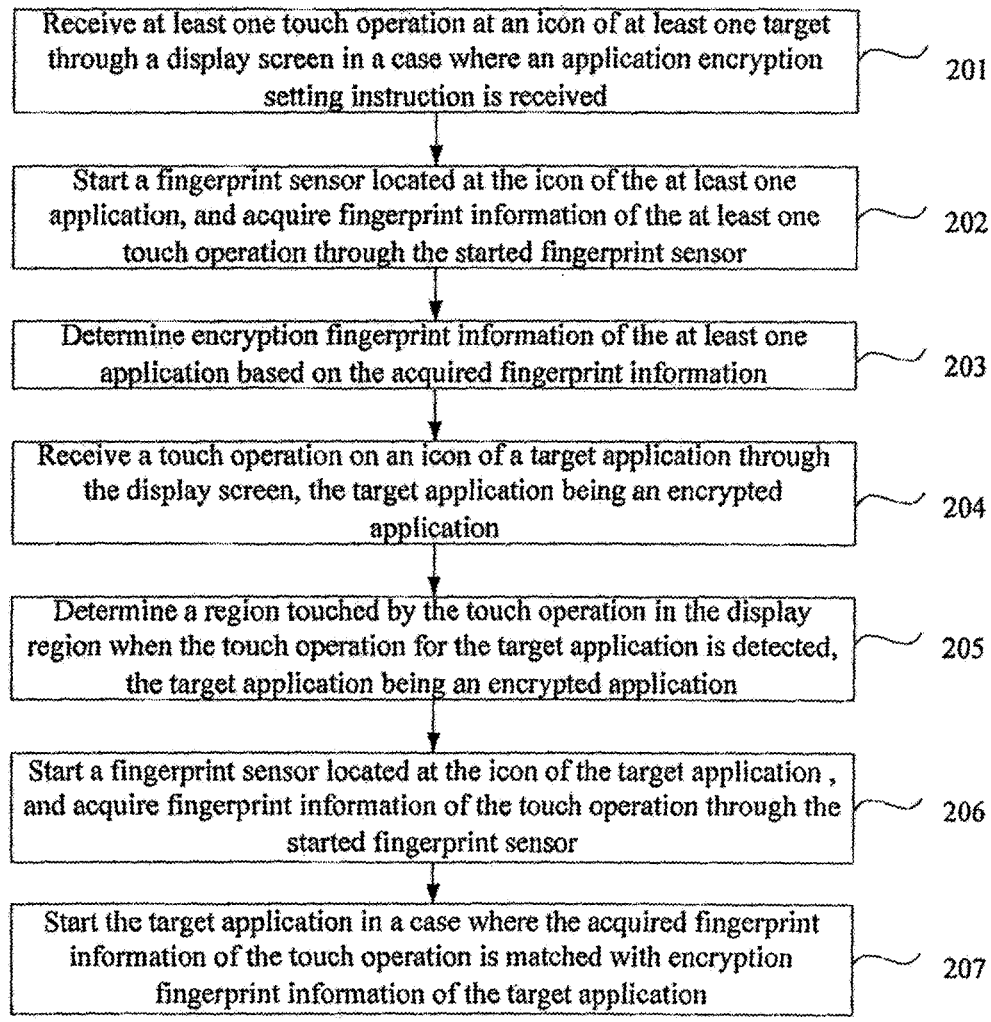
FIG. 2A Is a flowchart of another application decryption method according to an embodiment of the disclosure.

FIG. 2A is a flowchart of an application decryption method according to an exemplary embodiment. The method may be applied to a terminal such as a smart phone or a tablet computer. At least one fingerprint sensor is arranged below a display screen of the terminal. This application decryption method is described below by taking the solution of performing application decryption based on the touch operation acting on an icon of an application and the solution of performing application decryption based on the touch operation acting on any position on the display screen as examples. The difference in the two solutions mainly lies in the difference in block 205. As shown in FIG. 2A, the method includes blocks 201 to 207.

In block 201, in a case where an application encryption setting instruction is received, at least one touch operation is received at an icon of at least one target through the display screen.

A setting menu of the terminal may include an application encryption setting option. When a user is intended to encrypt an application installed in the terminal, the user may select the application encryption setting option to send an application encryption setting instruction to the terminal. When receiving the application encryption setting Instruction, the terminal may return to a desktop of the terminal to display all applications currently installed in the terminal. Thereafter, the terminal may receive at least one touch operation on the icon of at least one application which is currently displayed through the display screen, and then the terminal may determine the application on which the received touch operation acts to be an application to be encrypted.

Figure 2B:
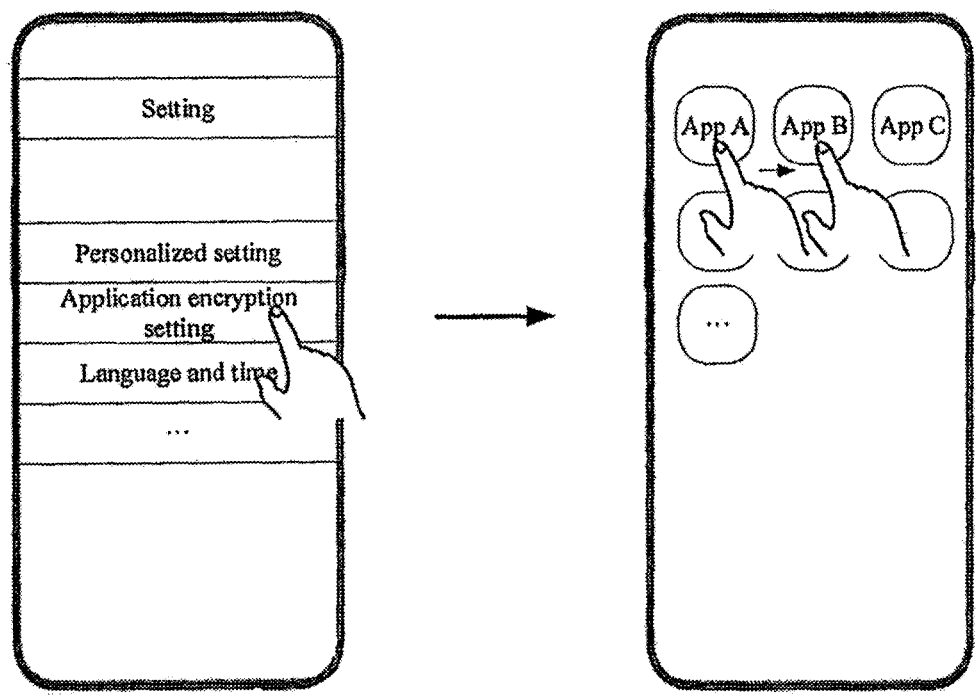
FIG. 2B is a schematic diagram of human-computer interaction for application encryption according to an embodiment of the disclosure.

FIG. 2B is a schematic diagram of human-computer interaction for encryption setting according to an embodiment of the disclosure. As shown in the left figure of FIG. 2B, after a user selects the application encryption setting option, the terminal may display application icons of all applications currently installed in the terminal. Thereafter, as shown in the right figure of FIG. 2B, the user may select to encrypt, for example, two applications, i.e., an application A and an application B, and in this process, the terminal may receive two touch operations of the user on the icon of the application A and the icon of the application B.

In block 202, a fingerprint sensor located at the icon of the at least one application is activated, and fingerprint information of the at least one touch operation is acquired through the activated fingerprint sensor.

In the embodiment of the disclosure, at least one fingerprint sensor is arranged below the display screen of the terminal. After the terminal receives the at least one touch operation on the icon of the at least one application through the display screen, the fingerprint sensor located at the icon of the at least one application may be activated, and the fingerprint information of the at least one touch operation may be acquired through the activated fingerprint sensor.

If the user executes touch operations on icons of a plurality of applications at one time, the terminal, every time when receiving a touch operation, may activate the fingerprint sensor located at the icon corresponding to the touch operation and acquire fingerprint information of the touch operation through the fingerprint sensor. Or, the terminal may activate all of the fingerprint sensors located at the icons of all of the displayed applications when receiving the first touch operation and, every time when receiving a touch operation, acquire the fingerprint information of the touch operation through the fingerprint sensor located at the icon corresponding to the touch operation. Or, the terminal, when receiving the first touch operation, may only activate the fingerprint sensor located at the icon on which the first touch operation acts and acquire the fingerprint information of the first touch operation through the activated fingerprint sensor, and for subsequently received touch operations, the terminal may not acquire the corresponding fingerprint information. In this case, the terminal may acquire the fingerprint information of only one touch operation, that is, when the application encryption setting instruction is triggered once, for the plurality of applications to be encrypted, only one piece of encryption fingerprint information may be acquired.

Of course, when the application encryption setting instruction is triggered once, if only one piece of encryption fingerprint information is acquired for a plurality of applications to be encrypted, the fingerprint sensor activated by the terminal may be a fingerprint sensor located at the icon on which the first touch operation acts and may alternatively be a fingerprint sensor located at any icon in the icons corresponding to the other touch operations.

In an exemplary embodiment, the terminal may activate the corresponding fingerprint sensor for fingerprint information acquisition according to the icon, on which the touch operation acts, of the at least one application in the abovementioned manners. The terminal may also directly activate all the fingerprint sensors arranged below the display screen and then acquire the fingerprint information of the user through each fingerprint sensor, located at the icon of the application on which the touch operation acts, in all of the sensors.

In block 203, encryption fingerprint information of the at least one application is determined based on the acquired fingerprint information.

After the terminal acquires the fingerprint information of the user through the activated fingerprint sensor, the terminal may set the encryption fingerprint information of the at least one application according to the acquired fingerprint information.

Based on the descriptions concerning block 202, different methods for setting the encryption fingerprint information of the at least one application may be adopted according to different methods for acquiring the fingerprint information.

When the user executes a selection operation on at least one application while the terminal acquires only one piece of fingerprint information of the user, the terminal may determine the acquired fingerprint information to be the encryption fingerprint information of the at least one application.

In an optional mode, the user sequentially executes touch operations at the icons of a plurality of applications at one time, a plurality of fingerprint sensors located at the plurality of icons may be activated to acquire fingerprint information of the touch operations and the user may execute the touch operations on different application icons with different fingers. In such a case, the terminal may acquire a plurality of pieces of different fingerprint information. At this moment, the terminal may determine an amount of the fingerprint information belonging to a same finger in the acquired fingerprint information and determine any one piece of the fingerprint information corresponding to a finger with the most fingerprint information to be the encryption fingerprint Information of the plurality of applications. If the finger with the most fingerprint information may not be determined according to the acquired fingerprint information, the terminal may determine, for example, the first acquired fingerprint information to be the encryption fingerprint information of the plurality of applications. Or, the terminal may display a fingerprint selection option and the user may select specific fingerprint information as the encryption fingerprint information of the plurality of applications. That is, in this implementation mode, the plurality of applications may correspond to the same encryption fingerprint information.

In another optional mode, when the user executes touch operations at icons of a plurality of applications and the terminal correspondingly acquires a plurality of pieces of fingerprint information when the user executes the plurality of touch operations, for each piece of fingerprint information in the plurality of pieces of fingerprint information, the terminal may determine the fingerprint information to be the encryption fingerprint information of the application on which the touch operation generating the fingerprint information acts.

For example, if the user executes touch operations on an application 1, an application 2 and an application 3 and the terminal acquires fingerprint information 1 when the user executes the touch operation on the application 1, fingerprint information 2 when the touch operation is executed on the application 2 and fingerprint information 3 when the touch operation is executed on the application 3, in such a case, the terminal may determine the fingerprint information 1 to be encryption fingerprint information of the application 1, determine the fingerprint information 2 to be encryption fingerprint information of the application 2 and determine the fingerprint information 3 to be encryption fingerprint information of the application 3. Any two pieces of the fingerprint information 1, the fingerprint information 2 and the fingerprint information 3 may be the same, or all of the fingerprint information 1, the fingerprint information 2 and the fingerprint information 3 may be the same, or all of the fingerprint information 1, the fingerprint information 2 and the fingerprint information 3 may be different.

In block 204, an application identifier of the at least one application is acquired, and the application identifier of the at least one application and the encryption fingerprint information of the at least one application are correspondingly stored.

After the terminal determines the acquired fingerprint information of the at least one touch operation to be the encryption fingerprint information of the at least one application, the terminal may acquire the application identifier of the at least one application and then correspondingly store the acquired application identifier of the at least one application and the determined encryption fingerprint information of the at least one application. The application identifier may be an application icon, an application name or any other information capable of uniquely identifying the application.

As mentioned in the description concerning block 203, when at least one application corresponds to the same encryption fingerprint information, the terminal may correspondingly store the encryption fingerprint information and the application identifier of the at least one application. When each application corresponds to one piece of encryption fingerprint information, the terminal may correspondingly store the encryption fingerprint information and the application.

In an exemplary embodiment, in a possible situation, the user may only want to encrypt the at least one application within a time period. For example, for some game applications, for preventing an underaged child in the family from starting the game applications, the user may set the applications to be encrypted within a time period in which the user gets along with the underaged child. For example, in a time period 18:00-24:00, the user may come home from work and get along with the underaged child, and the at least one application may be set to be encrypted during this time period to avoid the underaged child from starting the application; and in other time period, the at least one application may not be encrypted. Of course, the user may also set the at least one application to be encrypted within a time period in another scenario. The abovementioned scenario is only a possible application scenario in the embodiment of the disclosure and not intended to limit a usage scenario of this encryption manner.

Based on the above descriptions, the terminal may also acquire a preset time range input or selected by the user after acquiring at least one application identifier, the preset time range being an encryption time period of the at least one application. That is, the at least one application may be encrypted within the preset time range and may not be encrypted in other time out of the preset time range.

In addition, the step may be executed after block 203, or after block 201, or at the same time of block 203, which will not be limited in the embodiment of the disclosure.

In the embodiment of the disclosure, the terminal may encrypt the application through blocks 201-204. The above Is only a possible encryption method in the embodiment of the disclosure and not intended to limit the encryption method. During practical application, the terminal may also display an application list when detecting the application encryption setting instruction, and when detecting a selection operation of the user for at least one application in the application list, the terminal may prompt the user to input the fingerprint information. In such a situation, the user may input the fingerprint information at any position of the display screen of the terminal, and the terminal may determine the acquired fingerprint information to be the encryption fingerprint information of the at least one application. The terminal may encrypt the application through the fingerprint information with reference to a related technology, which will not be elaborated in the embodiment of the disclosure.

Based on the above descriptions, it can be seen that, in the embodiments of the disclosure, encryption over the application installed in the terminal is a system-level encryption behavior, that is, the terminal encrypts the application and subsequent decryption is also completed by the terminal.

After the terminal encrypts the application, when the user uses the encrypted application, the terminal may decrypt the encrypted application by the method introduced in blocks 205-207.

In block 205, a touch operation on an icon of a target application is received through the display screen, the target application being an encrypted application.

When the user is intended to open an encrypted application, the user may execute the touch operation on the icon of the target application. Herein, the target application is the encrypted application the user is currently intended to open. In this situation, the terminal may detect whether the touch operation for the encrypted application is received or not in real time.

The terminal may display encrypted applications in a display manner of displaying unencrypted applications. That is, when displaying icons of applications, the terminal may not distinguish the encrypted applications from the unencrypted applications.

In another implementation mode, the user may not need to execute a touch operation on the target application, and instead, the user may execute the touch operation at any position on the display screen of the terminal. In this situation, the terminal only receives the touch operation of the user through the display screen, that is, block 205 may alternatively be that the touch operation is received through the display screen.

In block 206, the fingerprint sensor located at the icon of the target application is activated, and fingerprint information of the touch operation is acquired through the activated fingerprint sensor.

After the terminal receives the touch operation on the icon of the target application, the terminal may activate the fingerprint sensor located at the icon of the application and acquire the fingerprint information generated by the touch operation through the activated fingerprint sensor.

In an exemplary embodiment, when the target application is an application encrypted within the preset time range, the terminal may also acquire receiving time of the touch operation. Thereafter, the terminal may judge whether the receiving time is within the preset time range or not, and if the receiving time is within the preset time range, the target application is an encrypted application, that is, the terminal is required to decrypt the target application before the user can use the encrypted application. The terminal may activate the fingerprint sensor located at the icon on which the touch operation acts to acquire the fingerprint information of the touch operation.

If the touch operation of the user at any position on the display screen is received through the display screen in block 205, the terminal, when receiving the touch operation, may directly activate a plurality of fingerprint sensors arranged below the display screen of the terminal and acquire the fingerprint information of the touch operation through the fingerprint sensor located at the position on which the touch operation acts in the plurality of fingerprint sensors.

In block 207, the target application is started in a case where the acquired fingerprint information of the touch operation is matched with encryption fingerprint information of the target application.

Based on the descriptions concerning block 205, if the terminal receives the touch operation on the icon of the target application through the display screen, the terminal, after acquiring the fingerprint information of the touch operation through the fingerprint sensor located at the icon of the target application, may compare the fingerprint information with the encryption fingerprint information of the target application. If the acquired fingerprint information of the touch operation is matched with the encryption fingerprint information of the target application, the terminal may start the target application. If the acquired fingerprint information is not matched with the encryption fingerprint information of the target application, the terminal may not respond to the touch operation of the user, that is, the target application is not started.

The terminal may obtain a number of times for which the fingerprint information not matched with the encryption fingerprint information of the target application is acquired within a preset duration, and in a case where the number of times is larger than a preset number of times, the terminal may display prompting information to prompt the user that the target application is encrypted.

In the embodiment of the disclosure, the terminal may not distinguish the encrypted applications from the unencrypted applications when displaying them. Since fingerprint information input when another user except the user of the terminal starts the target application Is not matched with the encryption fingerprint information of the target application, the terminal does not start the target application and the terminal may also not display other information. For the other user of the terminal, the other user may not know that a reason why the target application is not started is that the target application is an encrypted application. In such a case, the other user may execute a plurality of touch operations on the target application to try to start the target application, and the terminal may display prompting information to prompt the user that the target application is encrypted when continuously receiving wrong fingerprint information for many times, thereby making the user stop performing touch operations to reduce futile processing processes of the terminal.

In an exemplary embodiment, in another possible implementation mode, if the terminal may acquire the fingerprint information of the touch operation as long as detecting the touch operation of the user in block 205, after the terminal acquires the fingerprint information of the touch operation through the activated fingerprint sensor, the terminal may search stored fingerprint Information to determine whether encryption fingerprint information matched with the acquired fingerprint information exists or not. If the encryption fingerprint information matched with the acquired fingerprint information is found, the terminal may directly decrypt at least one application corresponding to the encryption fingerprint information. That is, the terminal may decrypt at least one application corresponding to the fingerprint information according to the fingerprint information generated by any touch operation executed by the user, and thereafter, when the user is intended to start the corresponding application, the application may be directly started. The other applications not matched with the fingerprint information are still in an encrypted state, and the user cannot start these applications in the encrypted state. The terminal may set a timer at the same time of decrypting the at least one application corresponding to the fingerprint information generated by any touch operation. When the timer does not count to the preset duration, the terminal may keep the at least one application in a decrypted state, and when the timer counts to the preset duration, the terminal may convert the at least one application into an encrypted application again. That is, after the terminal decrypts the at least one application, the user may directly start the application without identity verification within the preset duration after decryption, and if the user is intended to start the application after the preset duration, identity verification is required to be performed again.

In the embodiment of the disclosure, the plurality of fingerprint sensors may be arranged below the display screen of the terminal, the terminal, when detecting the touch operation for the target application, may determine a region touched by the touch operation in the display screen, activate, among the plurality of fingerprint sensors, a fingerprint sensor located in the region and acquire the fingerprint information generated by the touch operation through the activated fingerprint sensor, and in a case where the acquired fingerprint information is consistent with the encryption fingerprint information of the target application, the terminal directly starts the application. In such a manner, while the user opens the application, no matter where the application is currently located on the display screen, the terminal may directly acquire the fingerprint information while the user opens the application so as to verify an identity of the user. The terminal does not display a verification interface to prompt the user to input verification information at a specific position, so that an operation flow is simplified, and the user may execute an application decryption operation more flexibly. Since the terminal may not display the verification interface, for a legal user, when a finger with which the user selects the application is the same as a finger with which the encryption fingerprint information of the application is set, the user may directly start and enter the application without feel like being stopped in terms of user experience, and the whole decryption process is smoother.

In addition, in the embodiment of the disclosure, the terminal may set at least one application to be encrypted within a preset time range, so that the application may be encrypted more flexibly, and the underaged child in the family may be effectively prevented from getting addicted to an entertainment application such as a game.

After the application decryption method provided by the embodiment of the disclosure is explained and described, an application decryption device provided by the embodiment of the disclosure will now be introduced.

Figure 3A:
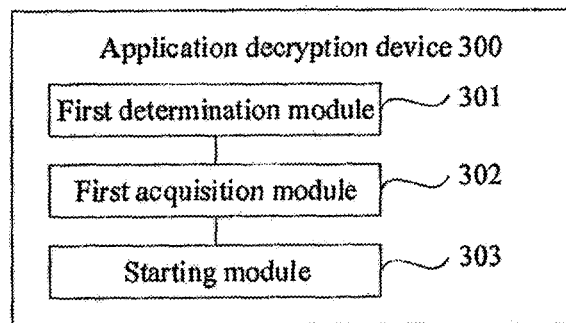
FIG. 3A is a block diagram of an application decryption device according to an embodiment of the disclosure.

FIG. 3A is a block diagram of an application decryption device 300 according to an embodiment of the disclosure. The application decryption device may be applied to a terminal, and one or more fingerprint sensors are arranged below a display screen of the terminal. Referring to FIG. 3A, the decryption device may be implemented by software, hardware or a combination of the two. The device includes: a first determination module 301, a first acquisition module 302 and a starting module 303.

The first determination module 301 is configured to receive a touch operation on an Icon of a target application through the display screen, the target application being an encrypted application.

The first acquisition module 302 is configured to activate a fingerprint sensor located at the icon of the target application and acquire fingerprint information of the touch operation through the activated fingerprint sensor.

The starting module 303 is configured to start the target application in a case where the fingerprint information of the touch operation is matched with encryption fingerprint information of the target application.

Figure 3B:
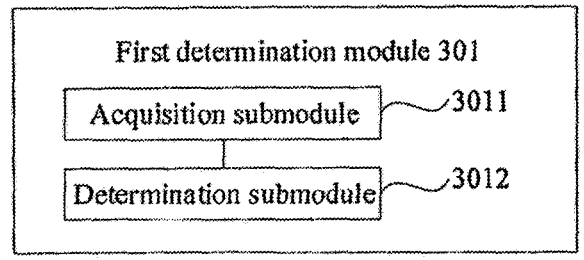
FIG. 3B is a block diagram of a first determination module according to an embodiment of the disclosure.

In an exemplary embodiment, referring to FIG. 3B, the first acquisition module 301 may include:

an acquisition submodule 3011, configured to acquire receiving time of the touch operation; and a determination submodule 3012, configured to activate the fingerprint sensor located at the icon of the target application in a case where the receiving time is within a preset time range.

Figure 3C:
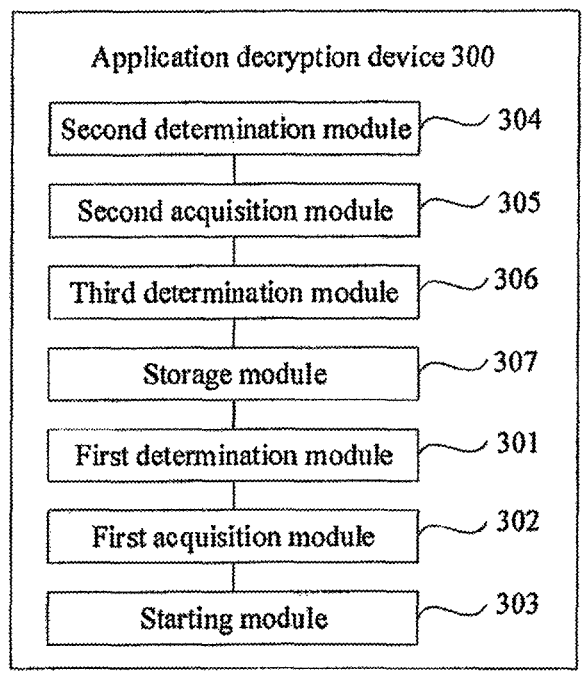
FIG. 3C is a block diagram of another application decryption device according to an embodiment of the disclosure.

In an exemplary embodiment, referring to FIG. 3C, the device may further include:

a second determination module 304, configured to, in a case where an application encryption setting instruction is received, receive at least one touch operation on an icon of at least one application through the display screen;

a second acquisition module 305, configured to activate a fingerprint sensor located at the icon of the at least one application and acquire fingerprint information of the at least one touch operation through the activated fingerprint sensor;

a third determination module 306, configured to determine encryption fingerprint information of the at least one application based on the acquired fingerprint information; and a storage module 307, configured to acquire an application identifier of the at least one application and correspondingly store the application identifier of the at least one application and the encryption fingerprint information of the at least one application.

Figure 3D:
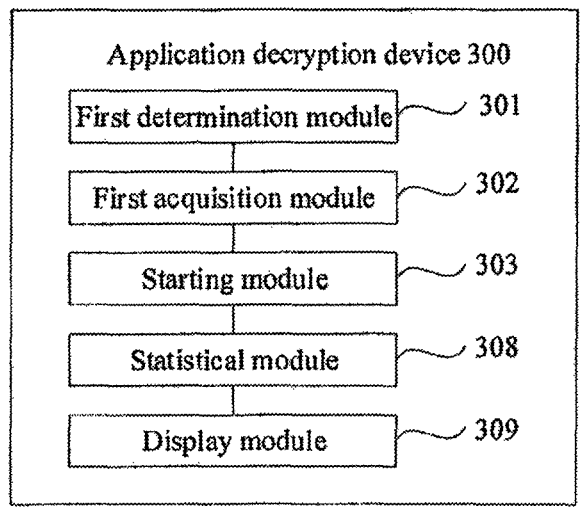
FIG. 3D is a block diagram of still another application decryption device according to an embodiment of the disclosure.

In an exemplary embodiment, referring to FIG. 3D, the device may further include:

a statistical module 308, configured to, in a case where the fingerprint information of the touch operation is not matched with the encryption fingerprint information of the target application, obtain a number of times for which the fingerprint information not matched with the encryption fingerprint information of the target application is acquired within a preset duration; and a display module 309, configured to, in a case where the number of times for which the fingerprint information not matched with the encryption fingerprint information of the target application is acquired is larger than a preset number of times, display prompting information for prompting that the target application is encrypted.

From the above, in the embodiment of the disclosure, a plurality of fingerprint sensors may be arranged below the display screen of the terminal, the terminal, when detecting the touch operation for the target application, may determine a region touched by the touch operation in the display screen, activate, among the plurality of fingerprint sensors, a fingerprint sensor located in the region and acquire the fingerprint Information generated by the touch operation through the activated fingerprint sensor, and in a case where the acquired fingerprint information is consistent with the encryption fingerprint information of the target application, the terminal directly starts the application. In such a manner, while the user opens the application, no matter where the application is currently located on the display screen, the terminal may directly acquire the fingerprint information while the user opens the application so as to verify an identity of the user. The terminal does not display a verification interface to prompt the user to input verification information at a specific position, so that an operation flow is simplified, and the user may execute an application decryption operation more flexibly.

It is important to note that, when the application decryption device provided by the embodiment performs decryption, descriptions are made only with division of each of the abovementioned functional modules as an example. However, during practical application, the functions may be allocated to different functional modules for realization according to a requirement, that is, an internal structure of the device may be divided into different functional modules to realize all or part of the functions described above. In addition, the application decryption device provided by the embodiment belongs to the same concept with the application decryption method embodiment and details about its specific implementation process may refer to the method embodiment and will not be elaborated herein.

Figure 4:
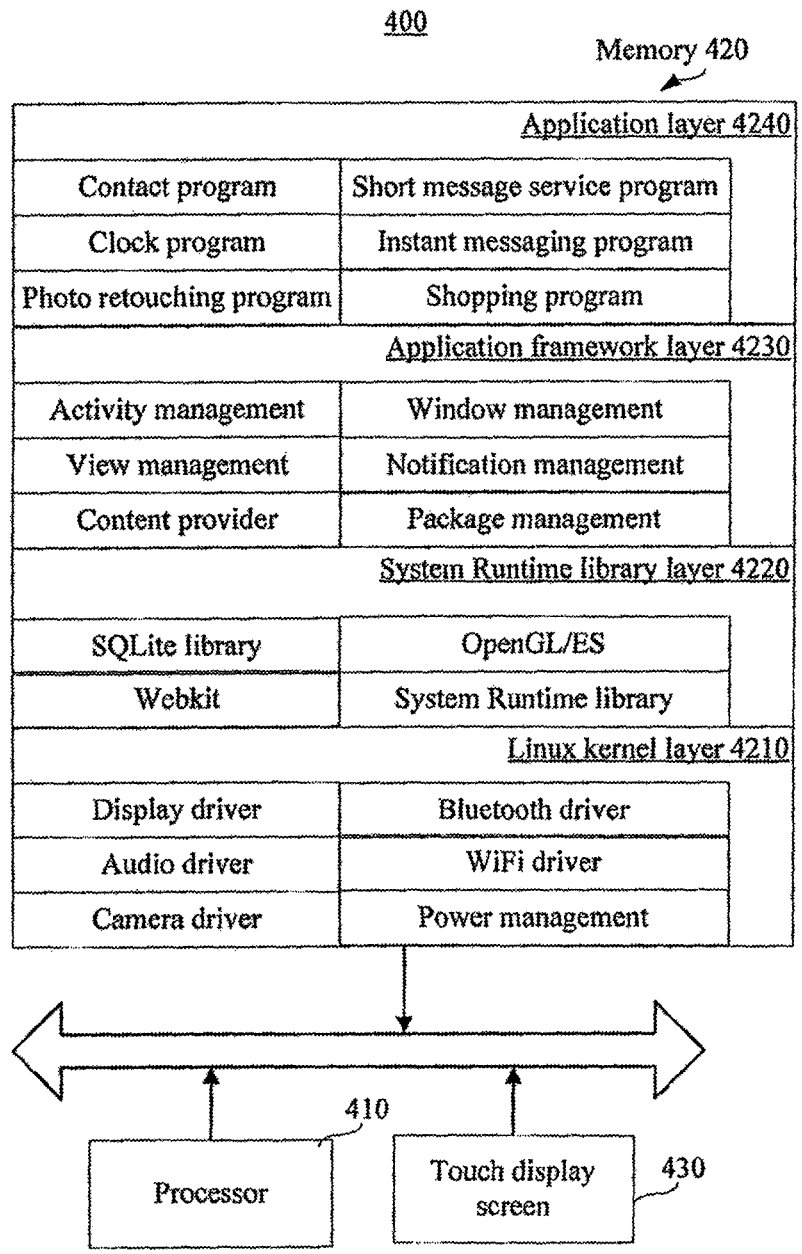
FIG. 4 is a structure diagram of a terminal according to an embodiment of the disclosure.
Figure 5:
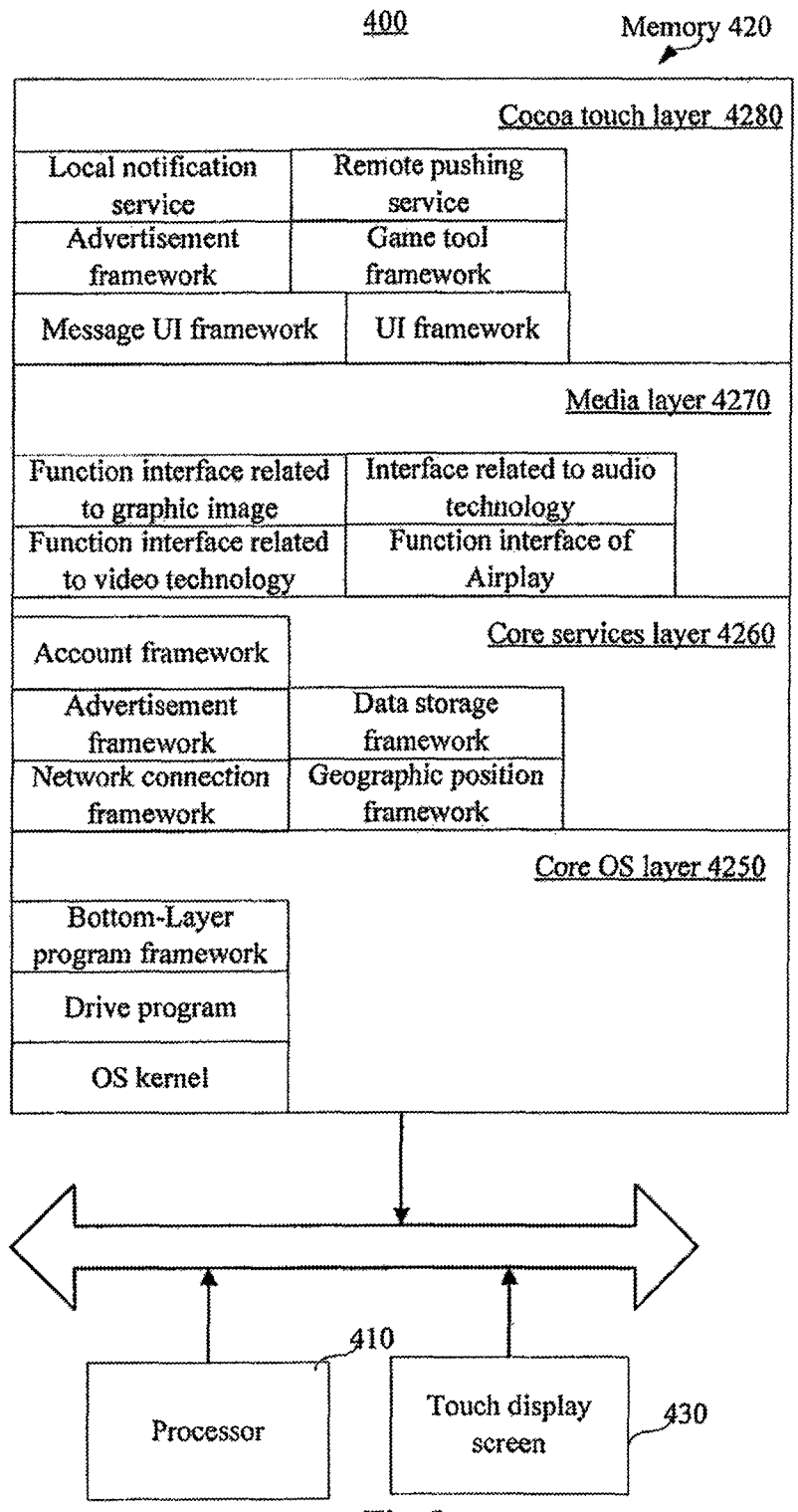
FIG. 5 is a structure diagram of another terminal according to an embodiment of the disclosure.

FIG. 4 and FIG. 5 are structure block diagrams of a terminal 400 according to an exemplary embodiment of the disclosure. The terminal 400 includes an application decryption device shown in FIG. 3A-3D. The terminal may be a mobile phone, a tablet computer, a notebook computer, an electronic book and the like. The terminal 400 may include one or more of the following components: at least one processor 410, at least one computer readable storage 420, a display screen (e.g., a touch display screen) 430 and at least one fingerprint sensor arranged below the display screen 430 of the terminal 400.

The processor 410 may include one or more processing cores. The processor 410 connects each part in the whole terminal 400 by virtue of various interfaces and lines, and executes various functions and data processing of the terminal 400 by running or executing an instruction, program, code set or instruction set stored in the memory 420 and calling data stored in the memory 420. In an exemplary embodiment, the processor 410 may be implemented in at least one hardware form of Digital Signal Processing (DSP), a Field-Programmable Gate Array (FPGA) and a Programmable Logic Array (PLA). The processor 410 may integrate one or combination of more of a Central Processing Unit (CPU), a Graphics Processing Unit (GPU), a modem and the like, wherein the CPU mainly processes an Operating System (OS), a User Interface (UI), an application program and the like; the GPU is configured to render and draw a content to be displayed on the display screen 430; and the modem is configured to process wireless communication. It can be understood that the modem may also not be integrated into the processor 410 but be independently implemented by a chip. The processor 410, when executing at least one computer executable instruction stored on the computer readable storage, carries out the following actions: a touch operation on an icon of a target application that is encrypted is received through the display screen; a fingerprint sensor located at the icon of the target application is activated, and fingerprint information of the touch operation is acquired through the activated fingerprint sensor; and the target application is started in a case where the fingerprint information of the touch operation is matched with encryption fingerprint information of the target application.

In an exemplary embodiment, the operation that the fingerprint sensor located at the icon of the target application is activated may include that: receiving time of the touch operation is acquired; and the fingerprint sensor located at the icon of the target application is activated in a case where the receiving time is within a preset time range.

In an exemplary embodiment, the processor 410, when executing at least one computer executable instruction stored on the computer readable storage, may further carry out the following actions; in a case where an application encryption setting instruction is received, at least one touch operation on an icon of at least one application is received through the display screen; a fingerprint sensor located at the icon of the at least one application is activated, and fingerprint information of the at least one touch operation is acquired through the activated fingerprint sensor; encryption fingerprint information of the at least one application is determined based on the acquired fingerprint information; and an application identifier of the at least one application is acquired, and the application identifier of the at least one application and the encryption fingerprint information of the at least one application are correspondingly stored.

In an exemplary embodiment, the processor 410, when executing at least one computer executable instruction stored on the computer readable storage, may further carry out the following actions: in a case where the fingerprint information of the touch operation is not matched with the encryption fingerprint information of the target application, a number of times for which the fingerprint information not matched with the encryption fingerprint information of the target application is acquired within a preset duration is obtained; and in a case where the number of times for which the fingerprint information not matched with the encryption fingerprint information of the target application is acquired is larger than a preset number of times, prompting information for prompting that the target application is encrypted is displayed.

The memory 420 may include a Random Access Memory (RAM) and may also include a Read-Only Memory (ROM). In an exemplary embodiment, the memory 420 includes a non-transitory computer-readable storage medium. The memory 420 may be configured to store the instruction, the computer program, a code, the code set or the instruction set. The memory 420 may include a program storage region and a data storage region, wherein the computer program storage region may store an instruction configured to implement the OS, an instruction configured for at least one function (for example, a touch function, a sound playing function and an image playing function), an instruction configured to implement each of the following method embodiments and the like; and the data storage region may store data (for example, audio data and a phonebook) created according to use of the terminal 400 and the like.

For example, if the OS is an Android system. The computer program and data stored in the memory 420 are shown in FIG. 4. A Linux kernel layer 4210, a system Runtime library layer 4220, an application framework layer 4230 and an application layer 4240 are stored in the memory 420. The Linux kernel layer 4210 provides bottom-layer drivers for various types of hardware of the terminal 400, for example, a display driver, an audio driver, a camera driver, a Bluetooth driver, a Wireless Fidelity (Wi-Fi) driver and power management. The system Runtime library layer 4220 provides a main feature support for the Android system Through some C/C++ libraries. For example, an SQLite library provides a database support, an OpenGL/ES library provides a three-Dimensional (3D) drawing support, and a Webkit library provides a browser kernel support. The system Runtime library layer 4220 further provides an Android Runtime library which mainly provides some kernel libraries to allow a developer to compile Android applications by virtue of a Java language. The application framework layer 4230 provides various Application Programming Interfaces (APIs) which may be used when application programs are constructed, and the developer may also construct own application programs by virtue of these APIs, for example, activity management, window management, view management, notification management, a content provider, package management, communication management, resource management and positioning management. At least one application program is run in the application layer 4240, and these application programs may be a contact program, short message service program, clock program, camera application and the like of the OS and may also be application programs developed by third-party developers, for example, an instant messaging program and a photo retouching program.

For example, the OS is an iPhone Operating System (105). The computer program and data stored in the memory 420 are shown in FIG. 5. The iOS includes: a core OS layer 4250, a core services layer 4260, a media layer 4270 and a cocoa touch layer 4280. The core OS layer 4250 includes an OS kernel, a drive program and bottom-layer program frameworks, and these bottom-layer program frameworks provide functions more approximate to hardware for program frameworks located in the core services layer 4260 to use. The core services layer 4260 provides system service and/or program frameworks required by the application programs, for example, a foundation framework, an account framework, an advertisement framework, a data storage framework, a network connection framework, a geographic position framework and a motion framework. The media layer 4270 provides audio and visual interfaces for the application programs, for example, an interface related to a graphic image, an interface related to an audio technology, an interface related to a video technology and an AirPlay interface related to an audio/video transmission technology. The cocoa touch layer 4280 provides frameworks related to various common interfaces for development of the application programs, and the cocoa touch layer 4280 is responsible for a touch interaction operation of a user on the terminal 400, for example, focal notification service, remote pushing service, an advertisement framework, a game tool framework, a message UI framework, a UIKit framework and a map framework.

In the frameworks shown in FIG. 5, the frames related to most of the application programs include, but not limited to: the foundation framework in the core services layer 4260 and the UIKit framework in the cocoa touch layer 4280. The foundation framework provides many basic object classes and data types, provide most basic system service for all of the application programs and is unrelated to UIs. Classes provided by the UIKit framework are basic UI class libraries and are configured to create touch-based UIs. An iOS application program may provide a UI based on the UIKit framework, so that a basic architecture of the application program is provided to construct the UI to draw and process a user interaction event, a response gesture and the like.

The display screen 430 is configured to receive a touch operation of a user executed by the user thereon or nearby by virtue of any proper object such as a finger and a stylus and display the UI of each application program. The display screen 430 is usually arranged on a front panel of the terminal 400. The display screen 430 may be designed into a full screen, a curved screen or an irregularly-shaped screen. The display screen 130 may further be designed into a combination of the full screen and the curved screen and a combination of the irregularly-shaped screen and the curved screen, which will not be limited in the embodiment.

Full Screen

Figure 6A:
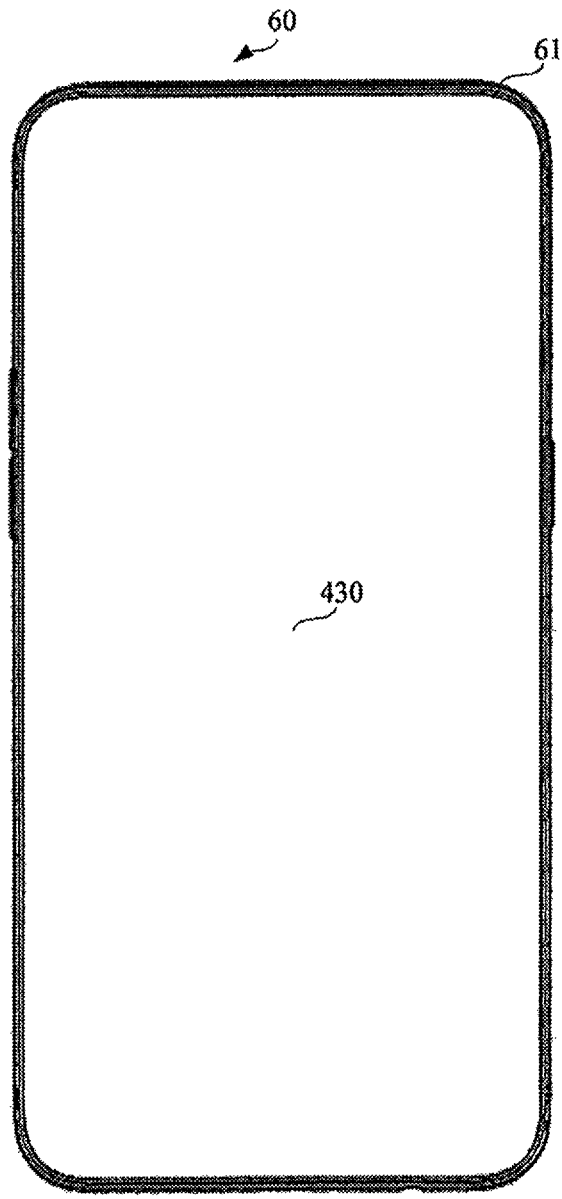
FIG. 6A is a structure diagram of a full screen according to an embodiment of the disclosure.

The full screen may refer to such a screen design that a screen-to-body ratio of the display screen 430 relative to the front panel of the terminal 400 exceeds a threshold value (for example, 80% or 90% or 95%). A calculation manner for the screen-to-body ratio is:(area of the display screen 430/area of the front panel of the terminal 400)*100%; another calculation manner for the screen-to-body ratio is:(area of an actual display region in the display screen 430/area of the front panel of the terminal 400)*100%; and another calculation manner for the screen-to-body ratio is: (diagonal of the display screen 430/diagonal of the front panel of the terminal 400)*100%. In a schematic example shown in FIG. 6A, almost the whole region on the front panel of the terminal 400 is the display screen 430, and all of the other region, except an edge formed by a middle frame 61, on the front panel 60 of the terminal 400 is the display screen 430. Four angles of the display screen 430 may be right angles or rounded angles.

The full screen may also be such a screen design that at least one front panel component is integrated to an interior or lower layer of the display screen 430. In an exemplary embodiment, the at least one front panel component includes: a camera, a fingerprint sensor, a proximity light sensor, a distance sensor and the like. In some embodiments, other components on a front panel of a conventional terminal are integrated into the whole region or part of the region of the display screen 430. For example, after a light sensing element in the camera is split into a plurality of light sensing pixels, each light sensing pixel is integrated into a black region of each display pixel in the display screen 430. Since the at least one front panel component is integrated to the interior of the display screen 430, the full screen has a higher screen-to-body ratio.

Of course, in some other embodiments, the front panel components on the front panel of the conventional terminal may also be arranged on a side edge or back surface of the terminal 400. For example, an ultrasonic fingerprint sensor is arranged below the display screen 430, a bone conduction receiver is arranged in the terminal 430 and the camera is arranged to be a pluggable structure located on the side edge of the terminal.

In some optional embodiments, when the terminal 400 adopts the full screen, edge touch sensors are arranged on a single side edge, or two side edges (for example, left and right side edges) or four side edges (for example, upper, lower, left and right side edges) of the middle frame of the terminal 400, and each edge touch sensor is configured to detect at least one operation of a touch operation, selecting operation, pressing operation, sliding operation and the like of the user over the middle frame. The edge touch sensor may be any one of a touch sensor, a thermodynamic sensor, a pressure sensor and the like. The user may apply an operation on the edge touch sensor to control an application program in the terminal 400.

Curved Screen

Figure 6B:
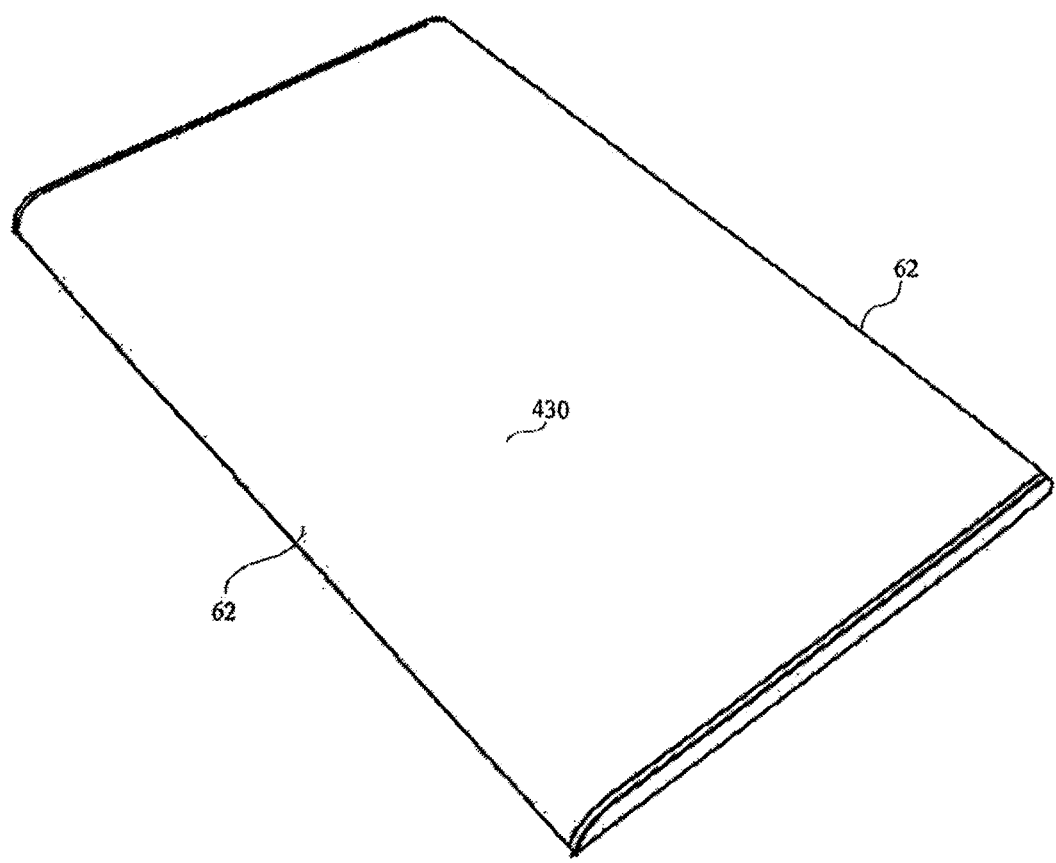
FIG. 6B is a structure diagram of a curved screen according to an embodiment of the disclosure.

The curved screen refers to such a screen design that the screen region of the display screen 430 is not located in the same plane. In general, the curved screen at least has such a section that the screen is in a bent shape and a projection of the curved screen in any plane direction of the section is a flat screen design, wherein the bent shape may be a U shape. In an exemplary embodiment, the curved screen refers to such a screen design manner that at least one side edge is in the bent shape. In an exemplary embodiment, the curved screen refers to that at least one side edge of the display screen 430 extends to and covers the middle frame of the terminal 400. The side edge of the display screen 430 extends to and covers the middle frame of the terminal 400, that is, the middle frame originally without a display function and a touch function is covered to form a display region and/or an operating region, so that the curved screen is endowed with a higher screen-to-body ratio. In an exemplary embodiment, in an example shown in FIG. 6B, the curved screen refers to such a screen design that the left and right side edges 62 are in the bent shape; or, the curved screen refers to such a screen design that the upper and lower side edges are in the bent shape; or, the curved screen refers to such a screen design that all of the upper, lower, left and right side edges are in the bent shape. In an optional embodiment, the curved screen is prepared from a touch screen material with flexibility.

Irregularly-Shaped Screen

The irregularly-shaped screen is a display screen of which an apparent shape is an irregular shape, and the irregular shape is not a rectangle or a rounded rectangle. In an exemplary embodiment, the irregularly-shaped screen refers to such a screen design that a bump, nick and/or hole are/is arranged on the rectangular or rounded rectangular display screen 430. In an exemplary embodiment, the bump, the nick and/or the hole may be located on an edge, screen center or both of the display screen 430. When being arranged on an edge, the bump, the nick and/or the hole may be arranged at a middle position or two ends of the edge; and when being arranged in the screen center, the bump, the nick and/or the hole may be arranged in one or more regions of an upper region, left upper region, left-side region, left lower region, lower region, right lower region, right-side region and right upper region of the screen. When being arranged in a plurality of regions, the bump, the nick and the hole may be distributed in a centralized manner and may also be distributed in a decentralized manner; and they may be symmetrically distributed and may also be asymmetrically distributed. In an exemplary embodiment, the number of the bump, the nick and/or the hole is not limited.

Since the irregularly-shaped screen covers an upper frontal region and/or lower frontal region of the display screen to form the display region and/or the operating region, the display screen occupies a larger space on the front panel of the terminal, and the irregularly-shaped screen also has a higher screen-to-body ratio. In some embodiments, at least one front panel component is accommodated in the nick and/or the hole, and the front panel component includes at least one of a camera, a fingerprint sensor, a proximity light sensor, a distance sensor, a receiver, an environmental luminance sensor and a physical button.

Figure 6C:
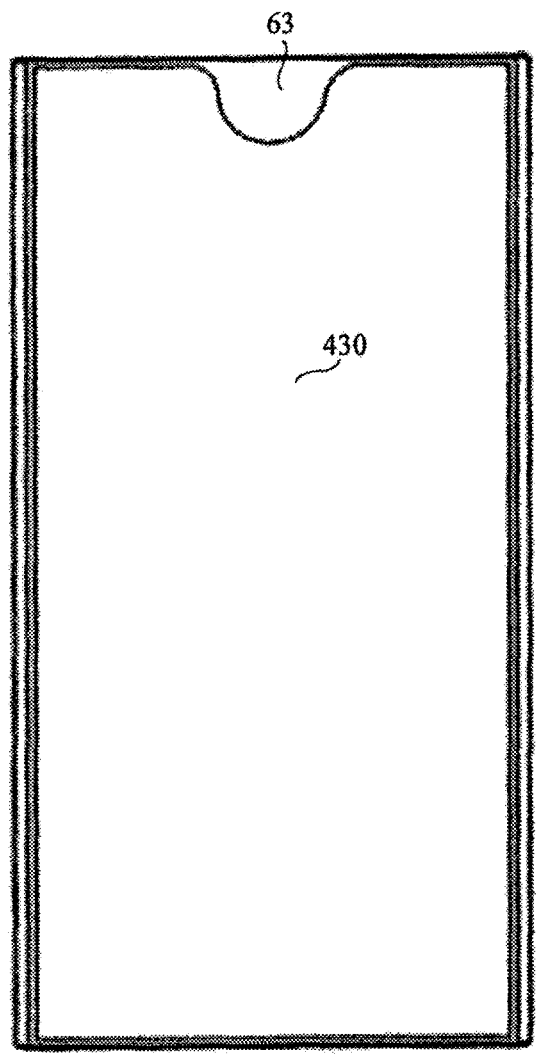
FIG. 6C is a structure diagram of an irregularly-shaped screen according to an embodiment of the disclosure.
Figure 6D:
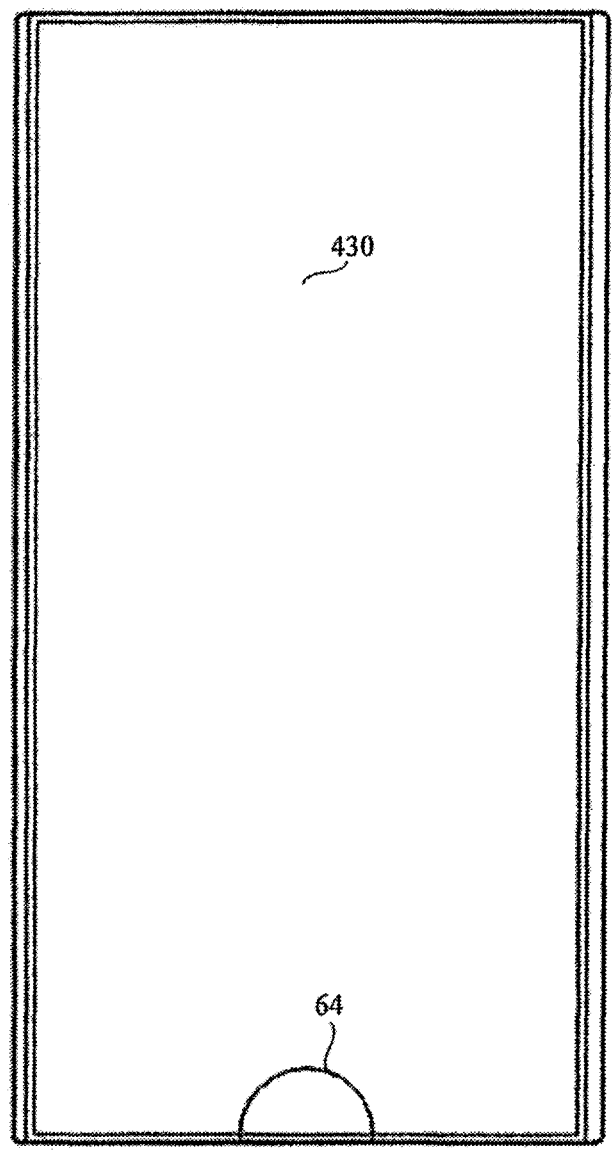
FIG. 6D is a structure diagram of another irregularly-shaped screen according to an embodiment of the disclosure.
Figure 6E:
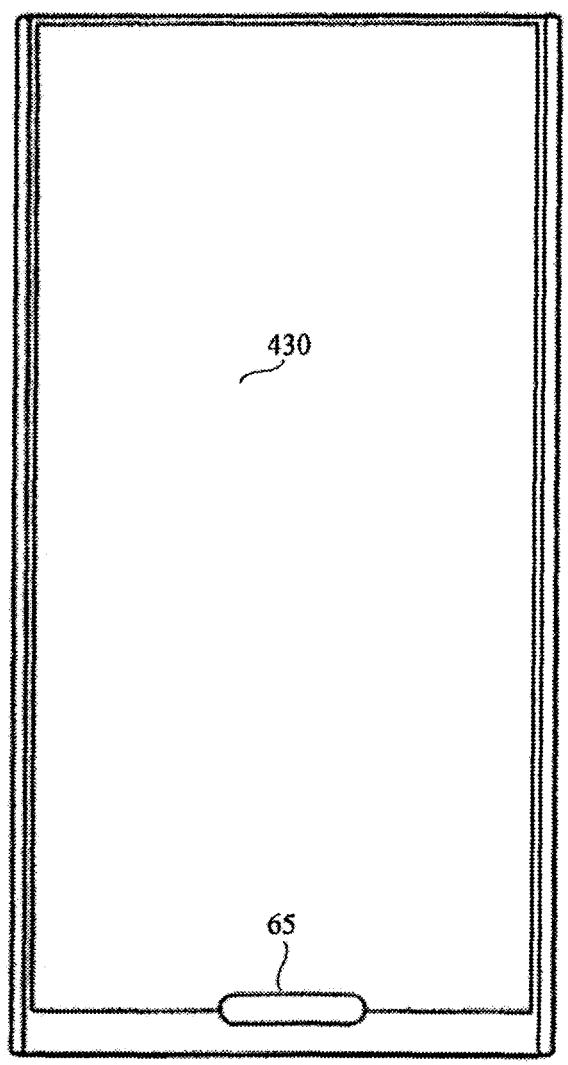
FIG. 6E is a structure diagram of still another irregularly-shaped screen according to an embodiment of the disclosure.
Figure 6F:
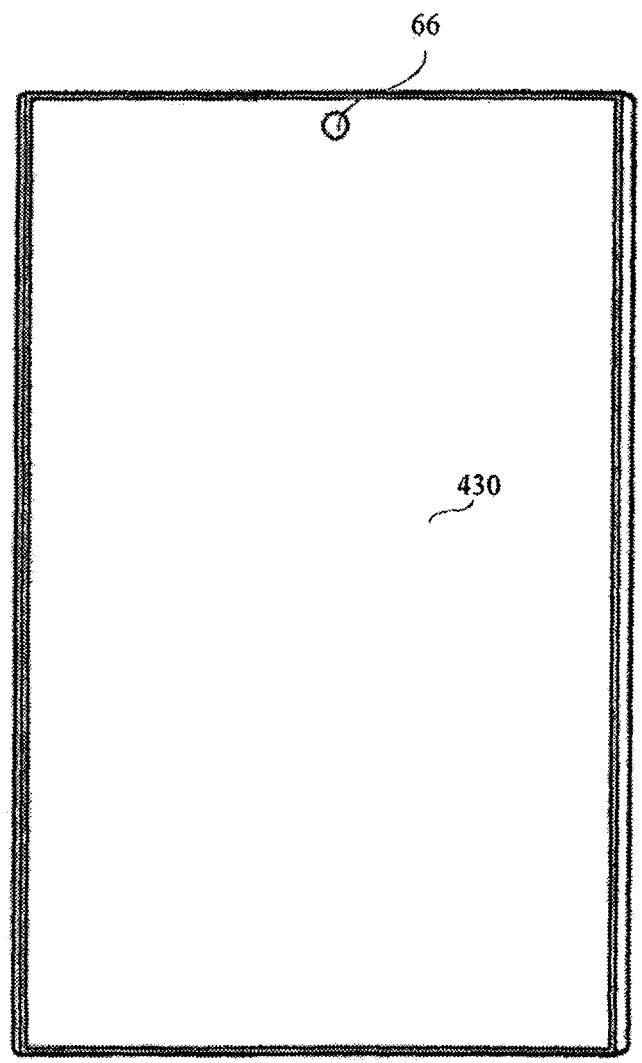
FIG. 6F is a structure diagram of still another irregularly-shaped screen according to an embodiment of the disclosure.

Exemplarily, the nick may be formed in one or more edges, and the nick may be a semicircular nick, an orthogonal rectangular nick, a rounded rectangular nick or an irregularly-shaped nick. In a schematic example shown in FIG. 6C, the irregularly-shaped screen may be such a screen design that a semicircular nick 63 is formed in a central position of an upper edge of the display screen 430, and a recessed position formed by the semicircular nick 63 is used for accommodating at least one front panel component of the camera, the distance sensor (also called a proximity sensor), the receiver and the environmental luminance sensor. Schematically, as shown in FIG. 60, the irregularly-shaped screen may be such a screen design that a semicircular nick 64 is formed in a central position of a lower edge of the display screen 430, and a recessed position formed by the semicircular nick 64 is used for accommodating at least one component of the physical button, the fingerprint sensor and a microphone. In a schematic example shown in FIG. 6E, the irregularly-shaped screen may be such a screen design that a semielliptical nick 65 is formed in the central position of the lower edge of the display screen 430, meanwhile, a semielliptical nick is also formed in the front panel of the terminal 400, the two semielliptical nicks enclose an elliptical region, and the elliptical region is used for accommodating the physical button or a fingerprint recognition module. In a schematic example shown in FIG. 6F, the irregularly-shaped screen may be such a screen design that at least one small hole N is formed in an upper half part of the display screen 430, and a recessed position formed by the small hole 66 is used for accommodating at least one front panel component of the camera, the distance sensor, the receiver and the environmental luminance sensor.

In addition, those skilled in the art can understand that the structure of the terminal 400 shown in the above drawings does not form any limit to the terminal 400, and the terminal 400 may include more or fewer components than those shown in the figures, or some components may be combined or different component arrangements are adopted. For example, the terminal 400 may further include components such as a radio frequency circuit, an input unit, a sensor, an audio circuit, a Wi-Fi module, a power supply and a Bluetooth module, which will not be elaborated herein.

All or part of the embodiments may be implemented by software, hardware, firmware or any combination thereof. In case of implementation with the software, all or part of the embodiments may be implemented in form of a computer program product. The computer program product includes one or more computer instructions. When the computer instructions are loaded and executed on a computer, the flows or functions according to the embodiments of the disclosure are all or partially formed. The computer may be a universal computer, a dedicated computer, a computer network or another programmable device. The computer instructions may be stored in a computer-readable storage medium or transmitted from one computer-readable storage medium to another computer-readable storage medium. For example, the computer instructions may be transmitted from one website, computer, server or data center to another website, computer, server or data center in a wired (for example, coaxial cable, optical fiber and Digital Subscriber Line (DSL) or wireless (for example, infrared, wireless and microwave) manner. The computer-readable storage medium may be any available medium accessible for the computer or data storage equipment including one or more integrated available media such as a server and a data center. The available medium may be a magnetic medium (for example, a floppy disk, a hard disk and a magnetic tape), an optical medium (for example, a Digital Versatile Disc (DVD), a semiconductor medium (for example, a Solid State Disk (SSD)) or the like.

Those of ordinary skilled in the art can understand that all or part of the steps of the embodiments may be completed by hardware and may also be completed by related hardware instructed by a program, the computer program may be stored in a computer-readable storage medium, and the storage medium may be a ROM, a magnetic disk, an optical disk or the like.

The above is only the exemplary embodiment of the disclosure and not intended to limit the disclosure. Any modifications, equivalent replacements, improvements and the like made within the spirit and principle of the disclosure shall fall within the scope of protection of the disclosure.

What is claimed is:

1. An application decryption method, comprising:
acquiring a touch operation through a display screen of a terminal;
acquiring fingerprint information of the touch operation through a fingerprint sensor located at a position corresponding to the touch operation, the fingerprint sensor being arranged below the display screen of the terminal; and
decrypting a target application that is encrypted, in a case where the fingerprint information of the touch operation is matched with encryption fingerprint information of the target application;
wherein decrypting the target application comprises: setting a state of the target application as a decrypted state in a case where the touch operation is not used for requesting to start the target application; and setting the state of the target application as an encrypted state, when a preset duration has elapsed after the state of the target application is set as the decrypted state.

2. The method as claimed in claim 1, further comprising:
starting the target application after decrypting the target application, in a case where the touch operation is used for requesting to start the target application.

3. The method as claimed in claim 2, wherein starting the target application in the case where the touch operation is used for requesting to start the target application comprises:
starting the target application in a case where the touch operation acts on an icon of the target application.

4. The method as claimed in claim 1, wherein acquiring the fingerprint information of the touch operation through the fingerprint sensor located at the position corresponding to the touch operation comprises one of:
activating the fingerprint sensor located at the position corresponding to the touch operation and acquiring the fingerprint information of the touch operation through the activated fingerprint sensor;
activating a plurality of fingerprint sensors arranged below the display screen and acquiring the fingerprint information of the touch operation through the fingerprint sensor, located at the position corresponding to the touch operation, in the plurality of fingerprint sensors.

5. The method as claimed in claim 1, wherein acquiring the fingerprint information of the touch operation through the fingerprint sensor located at the position corresponding to the touch operation comprises:
acquiring receiving time of the touch operation; and
acquiring the fingerprint information of the touch operation through the fingerprint sensor located at the position corresponding to the touch operation in a case where the receiving time is within a preset time range.

6. The method as claimed in claim 1, further comprising:
setting encryption fingerprint information for at least one application in the terminal in responsive to an application encryption setting instruction.

7. The method as claimed in claim 6, wherein setting the encryption fingerprint information for the at least one application in the terminal comprises:
acquiring, through the display screen, a target touch operation for selecting the at least one application, and acquiring fingerprint information of the target touch operation through a fingerprint sensor located at a position corresponding to the target touch operation;
determining the encryption fingerprint information for the at least one application based on the fingerprint information of the target touch operation, wherein in a case where the at least one application comprises a plurality of applications, the plurality of applications have mutually different encryption fingerprint information, or at least two applications in the plurality of applications have the same encryption fingerprint information; and
correspondingly storing an application identifier of the at least one application and the encryption fingerprint information of the at least one application.

8. The method as claimed in claim 1, wherein in a case where there are a plurality of target applications, decrypting the target application comprises:
simultaneously decrypting the plurality of target applications.

9. The method as claimed in claim 1, further comprising:
obtaining, in a case where the fingerprint information of the touch operation is not matched with the encryption fingerprint information of the target application, a number of times for which the fingerprint information not matched with the encryption fingerprint information of the target application is acquired within a preset duration; and
displaying, in a case where the number of times for which the fingerprint information not matched with the encryption fingerprint information of the target application is acquired is larger than a preset number of times, prompting information for prompting that the target application is encrypted.

10. A terminal, comprising a display screen, at least one fingerprint sensor arranged below the display screen, at least one processor and a computer readable storage, coupled to the at least one processor and storing at least one computer executable instruction thereon, which when the at least one computer executable instruction is executed by the at least one processor, causes the at least one processor to carry out following actions:
receiving, through the display screen, a touch operation on an icon of a target application that is encrypted;
activating a fingerprint sensor located at the icon of the target application, and acquiring fingerprint information of the touch operation through the activated fingerprint sensor; and
starting the target application in a case where the fingerprint information of the touch operation is matched with encryption fingerprint information of the target application;
wherein when the at least one computer executable instruction is executed by the at least one processor, the at least one processor is caused to further carry out following actions:
receiving, in a case where an application encryption setting instruction is received, at least one touch operation on an icon of at least one application through the display screen;
activating a fingerprint sensor locked at the icon of the at least one application, and acquiring fingerprint information of the at least one touch operation through the activated fingerprint sensor;
determining encryption fingerprint information of the at least one application based on the acquired fingerprint information; and
acquiring an application identifier of the at least one application, and correspondingly storing the application identifier of the at least one application and the encryption fingerprint information of the at least one application.

11. The terminal as claimed in claim 10, wherein activating the fingerprint sensor located at the icon of the target application comprises:
acquiring receiving time of the touch operation; and
activating the fingerprint sensor located at the icon of the target application in a case where the receiving time is within a preset time range.

12. The terminal as claimed in claim 10, wherein when the at least one computer executable instruction is executed by the at least one processor, the at least one processor is caused to further carry out following actions:
obtaining, in a case where the fingerprint information of the touch operation is not matched with the encryption fingerprint information of the target application, a number of times for which the fingerprint information not matched with the encryption fingerprint information of the target application is acquired within a preset duration; and
displaying, in a case where the number of times for which the fingerprint information not matched with the encryption fingerprint information of the target application is acquired is larger than a preset number of times, prompting information for prompting that the target application is encrypted.

13. A non-transitory computer-readable storage medium, on which a computer program is stored, wherein the computer program, when being executed by a processor, causes the processor to carry out the following actions:
acquiring a touch operation through a display screen of a terminal;
acquiring fingerprint information of the touch operation through a fingerprint sensor located at a position corresponding to the touch operation, the fingerprint sensor being arranged below the display screen of the terminal;
decrypting, in a case where the fingerprint information of the touch operation is matched with encryption fingerprint information of a target application that is encrypted, the target application:
wherein decrypting the target application comprises: setting a state of the target application as a decrypted state in a case where the touch operation is not used for requesting to start the target application; and setting the state of the target application as an encrypted state, when a preset duration has elapsed after the state of the target application is set as the decrypted state.

14. The non-transitory computer-readable storage medium as claimed in claim 13, wherein the computer program, when being executed by a processor, causes the processor to further carry out the following actions:

starting the target application after decrypting the target application, in a case where the touch operation is used for requesting to start the target application.

15. The non-transitory computer-readable storage medium as claimed in claim 14, wherein starting the target application in the case where the touch operation is used for requesting to start the target application comprises:
starting the target application in a case where the touch operation acts on an icon of the target application.

16. The non-transitory computer-readable storage medium as claimed in claim 13, wherein decrypting the target application comprises:
setting a state of the target application as a decrypted state in a case where the touch operation is not used for requesting to start the target application.

17. The non-transitory computer-readable storage medium as claimed in claim 16, wherein the computer program, when being executed by a processor, causes the processor to further carry out the following actions:
setting the state of the target application as an encrypted state, when a preset duration has elapsed after the state of the target application is set as the decrypted state.

* * * * *

UNITED STATES PATENT AND TRADEMARK OFFICE
CERTIFICATE OF CORRECTION

PATENT NO. : 10,862,686 B2  
APPLICATION NO. : 15/999290  
DATED : December 8, 2020  
INVENTOR(S) : Zhenzhen Chen Page 1 of 1

It is certified that error appears in the above-identified patent and that said Letters Patent is hereby corrected as shown below:

On the Title Page

(71) Applicant reads:  
"Guangdong (CN)"  
Should read:  
--Dongguan, Guangdong (CN)--

(73) Assignee reads:  
"Guangdong (CN)"  
Should read:  
--Dongguan, Guangdong (CN)--

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*